United States Patent [19]

Doering

[11] Patent Number: 4,812,830
[45] Date of Patent: Mar. 14, 1989

[54] TOUCH PANEL DISPLAY ASSEMBLY

[75] Inventor: Roger W. Doering, Hayward, Calif.

[73] Assignee: Digital Electronics Corporation, Hayward, Calif.

[21] Appl. No.: 939,529

[22] Filed: Dec. 8, 1986

[51] Int. Cl.$^4$ ............................................. G09G 1/00
[52] U.S. Cl. ...................................... 340/712; 340/31; 178/18; 250/221
[58] Field of Search ................... 340/711, 712, 365 P; 178/18; 250/221

[56] References Cited

U.S. PATENT DOCUMENTS

| | | | |
|---|---|---|---|
| 3,764,813 | 10/1973 | Clement et al. | 340/365 P |
| 4,459,476 | 7/1984 | Weissmueller et al. | 340/365 P |
| 4,675,569 | 6/1987 | Bowman et al. | 340/712 |
| 4,689,446 | 8/1987 | Hasegawa et al. | 340/365 P |
| 4,695,827 | 9/1987 | Beining et al. | 340/712 |

FOREIGN PATENT DOCUMENTS 2175393 11/1986 United Kingdom ............ 340/365 P

Primary Examiner—John W. Caldwell, Sr.
Assistant Examiner—Mahmoud Fatahiyar
Attorney, Agent, or Firm—Flehr, Hohbach, Test, Albritton & Herbert

[57] ABSTRACT

A touch panel assembly includes a filter plate having a recessed outer surface, first and second "L"-shaped supports each including a plurality of light-emitting or detecting elements along edges thereof with the "L"-shaped supports positioned adjacent to the inner surface of the filter plate and about the recessed outer surface whereby light from a lamp passes through the recessed outer surface to a detector element. A display is positioned in alignment with the recessed outer surface. The assembly is compact and facilitates the sealing of the display and electronics within a housing. The "L"-shaped supports for the light sources and detectors facilitate the assembly and servicing of the light elements in the assembly.

8 Claims, 2 Drawing Sheets

TOUCH PANEL DISPLAY ASSEMBLY

BACKGROUND OF THE INVENTION

This invention relates generally to touch panel displays, and more particularly the invention relates to a support assembly for mounting a touch panel including light emitters and detectors in a display housing.

Touch panel displays employ a crossed light-beam position encoder including X and Y coordinate arrays of paired infrared light sources and detectors for covering a display device surface with X and Y crossed lightbeams. The sources and detectors are scanned sequentially so that only one source is emitting light and its associated detector detecting light at any particular time. Means are provided for noting the digital address of the beams during sequential scanning and for recording those addresses. The digital address, and therefore the position of the broken beams, is then transferred back to a computer. See, for example, U.S. Pat. No. 3,775,560, for "Infrared Light Beam X-Y Position Encoder for Display Devices." The X and Y crossed lightbeams are superimposed on the display surface and spaced therefrom so that an operator can encode a position on the surface of the display by use of a finger, for example.

Means must be provided for supporting the light sources and detectors in close proximity to the front surface of the panel. Further, means must be provided for mounting the touch panel assembly in a housing for the display. Advantageously, the display should be mounted in the housing so that the display and electronics are protected from contamination from the ambient environment.

SUMMARY OF THE INVENTION

An object of the present invention is an improved assembly for mounting a touch panel display in a display housing.

Another object of the present invention is an improved arrangement for mounting light-emitting sources and detectors in a touch panel display.

Still another object of the present invention is a support assembly for providing a protective seal between the touch panel display and the ambient environment.

Features of the invention include a filter plate having a transparent recessed front portion for touch encoding the display and a flange portion surrounding the recessed portion for mating with an opening in a display housing and with sealant means provided around the periphery of the flange portion and for engaging the display housing. The filter plate mates with a display, and fastener means retains the assembly in alignment.

In accordance with another feature of the invention, light-emitting lamps are mounted on a first "L"-shaped frame, and light detectors are mounted on a second "L"-shaped frame. The two frames are positioned on the back surface of the filter plate around the recessed portion of the filter plate whereby light passes through the recessed portion from the lamps to detectors on opposing sides of the recessed portion.

In accordance with another feature of the invention, support means is provided on the filter plate for engaging the lamps and detectors in proper alignment.

The invention and objects and features thereof will be more readily apparent from the following detailed description and appended claims when taken with the drawings.

DETAILED DESCRIPTION OF THE ILLUSTRATED EMBODIMENT

Figure 1:
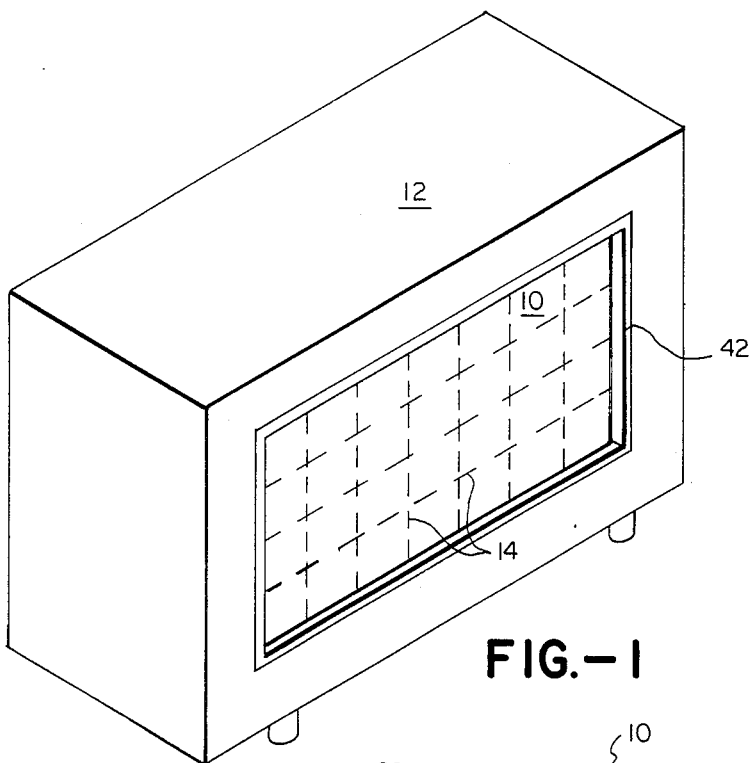
FIG. 1 is an isometric view of a touch panel display and housing.

Referring now to the drawings, FIG. 1 is an isometric view of a touch panel display 10 and a housing 12 in accordance with one embodiment of the invention. The display assembly 10 includes a recessed portion whereby infrared light is projected across the recessed portion in a grid pattern as illustrated by the broken lines 14. As described above with reference to U.S. Pat. No. 3,775,560, the display can be encoded by interrupting lightbeams in the matrix 14 through use of the finger, for example.

Figure 2:
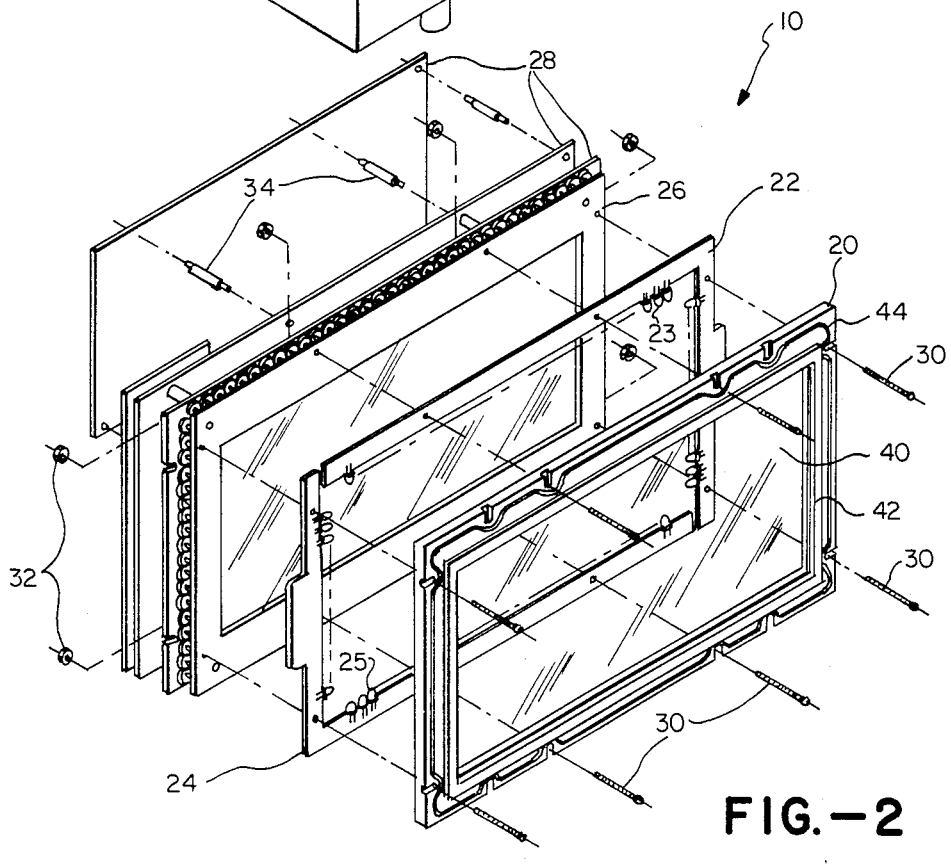
FIG. 2 is an exploded isometric view of a touch panel display and support assembly in accordance with one embodiment of the invention.

FIG. 2 is an exploded isometric view of the touch panel assembly 10 of FIG. 1. The assembly includes a filter plate 20, a first "L"-shaped support frame 22 for light sources 23 and a second "L"-shaped frame 24 for light detectors 25, a conventional display panel 26, and a plurality of electronic circuit boards 28 that provide the electronic control for the display 26 and the touch control. The several components are assembled and fastened together by means of bolts 30 and nuts 32 and by standoffs 34.

The filter plate 20 includes a recessed transparent surface 40 through which the display 26 is visible. Surrounding the recessed transparent surface 40 is a flange portion 42 that extends through an opening in housing 12 as illustrated in FIG. 1. Surrounding the flange portion 42 is an "O" ring or other suitable gasket 44 that mates with the inner surface of housing 12 to provide a protective seal for the display 26 and electronic circuit boards 28.

Figure 3:
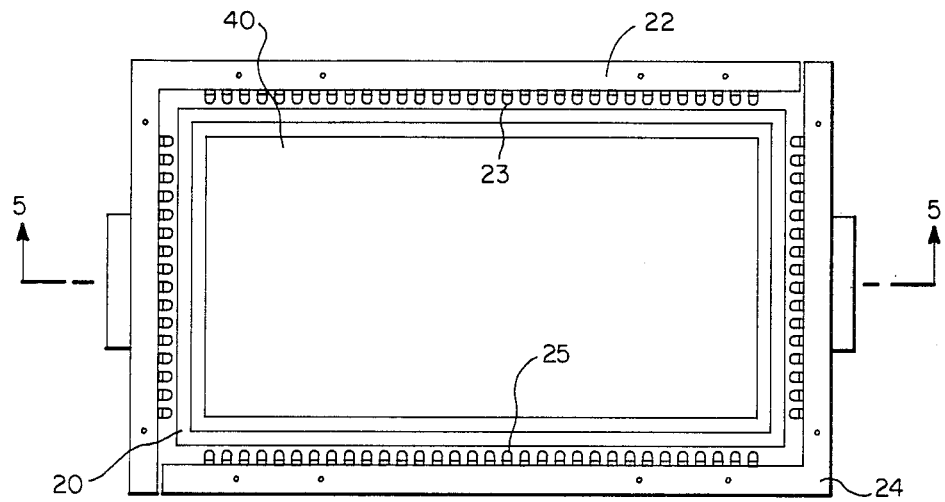
FIG. 3 is a rear view of the assembled filter plate and lamp and detectors in FIG. 3.
Figure 4:
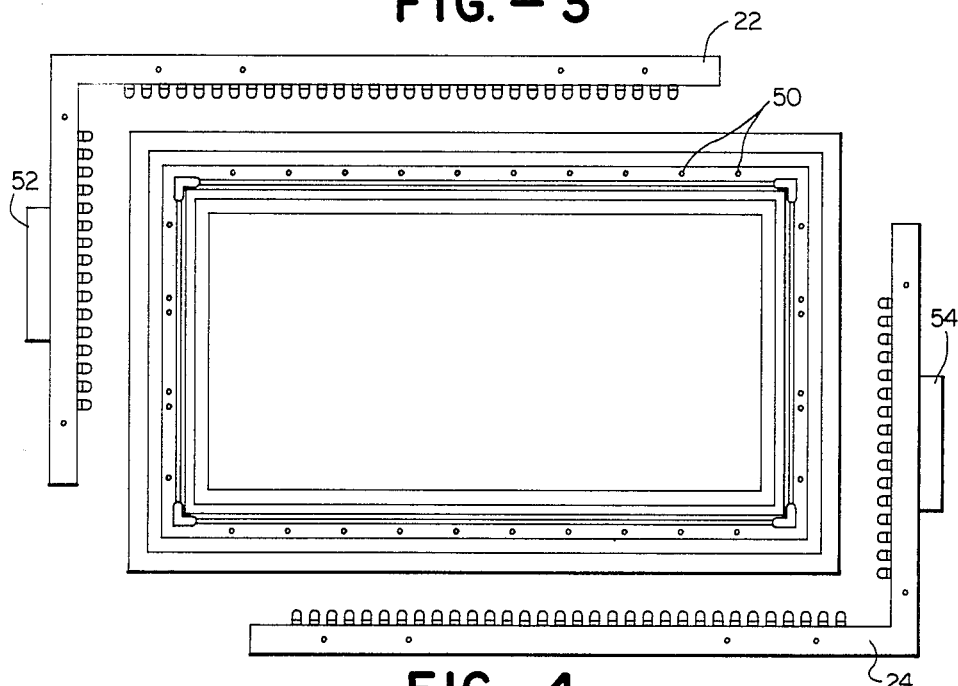
FIG. 4 is a rear view of the filter plate of FIG. 3 with the lamp and detector assemblies exploded therefrom.

FIG. 3 is a rear view of the filter plate 20 showing the "L"-shaped frames 22 and 24, respectively supporting the light-emitting lamps 23 and light detectors 25 mounted to the back surface of the filter plate 20, and FIG. 4 is a rear view of the filter plate 20 showing the two "L"-shaped support members exploded therefrom. The positioning and supporting of the "L"-shaped members 22, 24 is facilitated by rods 50 extending from the back surface of the filter plate 20, suitably aligned for positioning between adjacent lamps and adjacent detectors, respectively. Advantageously, the rods 50 are positioned whereby frames having differing numbers of lamps and detectors can be readily accommodated on the back surface of the filter plate. Electrical connectors 52 and 54 extend from frame 22 and 24, respectively, for interconnecting the lamps and detectors by suitable means such as ribbon cables to one of the circuit boards 28 shown in FIG. 2.

Figure 5:
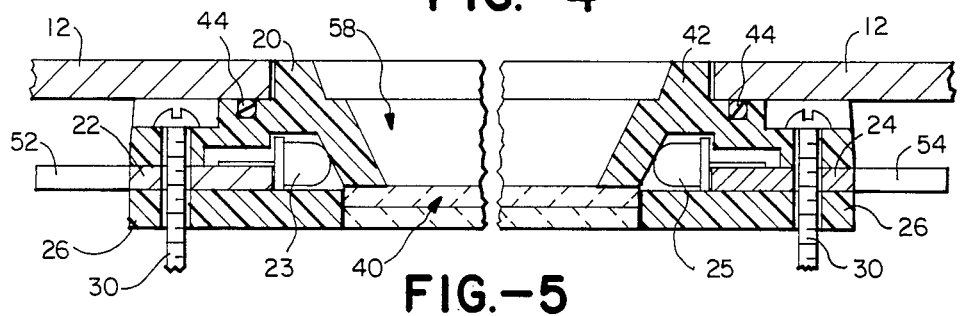
FIG. 5 is a section view of the assembled filter plate, lamps, and detectors, taken along the line 5—5 in FIG. 3.

FIG. 5 is a section view of the filter plate and assembled emitters and detectors taken along the line 5—5 in FIG. 3. The recessed portion of the filter plate 20 is shown at 58, and the transparent surface 40 preferably comprises an acrylic filter plate or a glass filter plate sealed to the remainder of the filter plate 20 which comprises an infrared transparent plastic. Infrared radiation from light-emitting diode 23 passes through the side portions of recess 58 in the transparent filter plate 20 to a light detector 25. Lamp 23 is mounted on support frame 22 and detector 25 is mounted on support frame 24. By placing a finger in the recessed portion 58, the light from diode 23 to detector 25 is interrupted, thereby providing position-encoding information. O-ring 44, provided in a groove in the surface of the filter plate 20, engages the back surface of housing 12 and seals the touch panel assembly to the housing.

A touch panel assembly in accordance with the present invention is readily manufactured and facilitates the assembly and replacement of light-emitting diodes and light detectors in the assembly. While the information has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A touch panel assembly comprising a filter plate having an outer surface, an inner surface, and a recessed outer surface portion for touch encoding a display, support means including a plurality of light sources and a plurality of light detectors mounted thereon, said support means comprising a first "L"-shaped support and a plurality of light sources thereon and a second "L"-shaped support and a plurality of light detectors thereon, means for mounting said support means to said inner surface of said filter plate whereby said support means is positioned adjacent to the inner surface of said filter plate around said recessed outer surface portion and whereby light from a light source passes through said recessed outer surface portion and is then detected by a light detector, and a display positioned in alignment with said recessed outer surface portion.

2. A touch panel assembly comprising a filter plate having an outer surface, an inner surface, and a recessed outer surface portion for touch encoding a display, support means including a plurality of light sources and a plurality of light detectors mounted thereon, said support means comprising a first "L"-shaped support and a plurality of light sources thereon and a second "L"-shaped support and a plurality of light detectors thereon, means for mounting said support means to said inner surface of said filter plate whereby said support means is positioned adjacent to the inner surface of said filter plate around said recessed outer surface portion and whereby light from a light source passes through said recessed outer surface portion and is then detected by a light detector, said means for mounting including a plurality of posts extending from said inner surface and arranged for positioning between light sources and lights detectors on said "L"-shaped supports, and a display positioned in alignment with said recessed outer surface portion.

3. The touch panel assembly as defined by claim 2 wherein said filter plate includes a raised flange extending outwardly from said outer surface and around said recessed outer surface portion.

4. The touch panel assembly as defined by claim 3 and further including seal means around said raised flange whereby said flange seats in an opening of a display housing and said seal means seals said assembly to said display housing.

5. The touch panel assembly as defined by claim 1 wherein said filter plate includes a raised flange around said recessed outer surface.

6. The touch panel assembly as defined by claim 5 and further including seal means around said raised flange whereby said flange seats in an opening of a display housing and said seal means seals said assembly to said display housing.

7. The touch panel assembly as defined by claim 1 and further including seal means on said outer surface around said recessed outer surface.

8. For use in a touch panel assembly, a support for light-emitting and detecting elements positioned around a recessed surface of the touch panel assembly, said support comprising an "L"-shaped printed circuit board, a plurality of elements selected from said light-emitting and detecting elements mounted along edges of said circuit board, an electrical contact, and printed conductors interconnecting said electrical contact and said elements.

* * * * *